(12) United States Patent
Pauty et al.

(10) Patent No.: US 7,252,420 B2
(45) Date of Patent: Aug. 7, 2007

(54) LIGHTING AND/OR SIGNALLING DEVICE FOR AN AUTOMOBILE

(75) Inventors: Etienne Pauty, Bobigny (FR); Jean-Paul Ravier, Bobigny (FR); Patrice Collot, Bobigny (FR); Claude Penn, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 11/174,311

(22) Filed: Jul. 1, 2005

(65) Prior Publication Data
US 2006/0002129 A1 Jan. 5, 2006

(30) Foreign Application Priority Data
Jul. 2, 2004 (FR) ................................... 04 07412

(51) Int. Cl.
*B60Q 1/04* (2006.01)
*F21S 8/10* (2006.01)
(52) U.S. Cl. .................. 362/516; 362/509; 362/518
(58) Field of Classification Search ................ 362/509, 362/516–518
See application file for complete search history.

(56) References Cited
U.S. PATENT DOCUMENTS
5,544,021 A * 8/1996 Lopez et al. ................ 362/518

6,439,739 B1 * 8/2002 Sischka ....................... 362/211
6,945,680 B2 * 9/2005 Holzmann et al. .......... 362/509

FOREIGN PATENT DOCUMENTS

| DE | 202 10 171 U1 * | 9/2002 |
| DE | 20210171 U1 | 10/2002 |
| DE | 10205776 | 9/2003 |
| EP | 1089324 | 1/2001 |
| EP | 1 382 900 A1 * | 1/2004 |
| EP | 1382900 | 1/2004 |
| EP | 1471305 | 10/2004 |

OTHER PUBLICATIONS

French Search Report dated Apr. 12, 2005.

\* cited by examiner

*Primary Examiner*—Sandra O'Shea
*Assistant Examiner*—James W Cranson, Jr.
(74) *Attorney, Agent, or Firm*—Morgan & Finnegan, L.L.P.

(57) ABSTRACT

The object of the invention is a lighting device for a motor vehicle, comprising a first light source focused on a first reflective zone and a second light source focused on second reflective zone. The first light source is able to emit light both in the direction of the first reflective zone and part of the second reflective zone, the light coming from the light source and reflected by the two reflective zones corresponding to a DRL daylight light beam.

16 Claims, 7 Drawing Sheets

LIGHTING AND/OR SIGNALLING DEVICE FOR AN AUTOMOBILE

The invention relates to a lighting and/or signalling device of the automobile headlight type.

The increase in requirements with regard to signalling for automobiles has in particular been embodied by the daytime lights regulation of the European Community entitled "ECE regulation R87: Daytime Running Lamp", which will be referred to hereinafter by the English abbreviation DRL. However, integrating this supplementary DRL function in a headlight is not always easy to achieve.

A first solution for fulfilling this DRL or "daytime light" function consists of permanently switching on the passing (dipped) lights, as Scandinavian countries currently practise. However, by proceeding in this way, the energy consumption is increased in a not insignificant fashion, and the service life of the light sources is reduced. The photometry of the dipped light, tolerated for this function, is also not the specific photometry of the DRL function.

The photometry of the DRL function is in fact relatively different from that of the other lighting functions provided by automobile headlights. In particular, the DRL beam is relatively thick along the optical axes, with a lower light intensity than for main or dipped lights.

It is also possible to provide a dedicated DRL daytime light but in this case it is necessary to add, at the front of the vehicle, in the spoiler or headlight, a cavity equipped with appropriate means and dedicated to the DRL function. Currently the illuminating surface required by regulation R87 for the DRL function is 40 cm$^2$ and it is not always easy to find a location for such an illuminating surface.

The patent EP 1 382 900 also proposed the use of a light source with two filaments, one of which is equipped with a cutoff and the other with no cutoff. This light source is associated with a reflector comprising a zone designed to cooperate with one of the filaments and another zone designed to cooperate with the second filament. One of the filaments is allocated to the DRL function, the other filament making it possible to obtain another type of light beam.

The aim of the invention is to propose a lighting device that offers a beam with a specific photometry, in particular a DRL function, and which is improved with respect to the existing lighting systems of the DRL type, in particular in terms of optical performance and/or better compliance with current regulations, and/or in terms of compactness.

The object of the invention is first of all a lighting device for an automobile, comprising a first light source focused on a first reflective zone and a second light source focused on a second reflective zone. The light source is able to emit light in the direction of both the first reflective zone and part of the second reflective zone, the light coming from the first light source and reflected by the two reflective zones corresponding to a daytime light or DRL light beam.

The first light source, allocated to the DRL function, thus uses not only a reflective zone that is dedicated to it but also part of a reflective zone that is overall adapted for another function. The association of the light source and the first reflective zone makes it possible to obtain the substance of the photometry required for a DRL, and another reflective zone is "diverted" so that it also participates in the DRL function even without its being particularly optimised for this, but so as to be able to guarantee in particular the minimum illuminating surface of 40 cm$^2$ required for a DRL. In this way a DRL function is obtained with a headlight of the multi-function type, in particular dual function, where the DRL function is achieved with great compactness of means: the sum of the surfaces of the reflective zones for obtaining several functions, including a DRL function, is smaller, less bulky than with a traditional solution where a lamp and its dedicated reflector must by themselves provide the photometry and illuminating surface required for a DRL.

The reflection by the second reflective zone of the light emitted by the first light source may be direct or indirect, that is to say it may be preceded by at least one prior reflection on a reflective surface.

A second light source is preferably able to emit light in the direction of the second reflective zone, and optionally also in the direction of part of the first reflective zone, the light coming from the second light source and reflected by the reflective zone or zones corresponding to a cutoff beam of the fog or dipped type, or to a beam without cutoff, of the main beam type.

The second reflective zone is thus designed to obtain, with the second source, the required photometry function, a portion of this second reflective zone, as mentioned above, also participating in the DRL function (the DRL not functioning simultaneously with the second function of the dipped or main beam type, and this portion will therefore alternatively function in dipped, main beam, fog or any other function referred to as AFS, standing for Advanced Front Lighting Systems . . . or in DRL mode). It is thus possible to obtain compact dual function DRL/dipped, DRL/main beam or DRL/fog lights.

As a so called AFS function, it is possible to cite:
- the function known as Town Light in English, meaning urban light. This function provides the broadening of a beam of the dipped type whilst slightly reducing its range;
- the function known as motorway lighting in English, meaning motorway light. This function provides an increase in the range of a dipped light;
- the function referred to as Overhead Light in English, meaning raised light. This function provides a modification of a dipped beam so that gantries situated at a height are illuminated in a satisfactory manner by means of the dipped lights;
- the so called AWL function (adverse weather light in English, meaning a light for bad weather). This function provides a modification of a dipped beam so that the driver is not dazzled by a reflection from his own headlight.

The invention proposes several embodiments. According to a first embodiment, the first reflective zone is a reflector defining a first cavity in which the first light source is disposed. And the second reflective zone is a reflector defining a cavity in which the second light source is disposed. It is then possible to obtain headlights with one cavity per function but, as has been seen, with one function "encroaching" on the cavity of the other function.

According to a second embodiment, the reflective zones form part of one and the same reflector defining a single cavity in which the two light sources are disposed. In this case, there are two functions with a single cavity.

For both the first embodiment and the second, the light sources can consist of distinct lamps, for example chosen from amongst halogen lamps (for example H1, H7, H21, H21/5, H4 or DFCS (the English abbreviation for "double filament complex shape") lamps, xenon lamps or ones based on one or more light emitting diodes etc, placed in the reflectors provided with appropriate lamp holes. For the second embodiment particularly, it is also possible to group together the two light sources in a single lamp, of the multi-filament type such as dual-filament lamps with or without cutoff. The advantage of these dual filament lamps is in particular their compactness. In addition, using a single dual filament lamp instead of two lamps in a reflector means that the reflector will be provided with only one lamp hole instead of two and that it will therefore offer a greater optically active surface for a constant volume/circumference. It is possible to make provision for one of the filaments, the one allocated to the DRL, to function at a lower electrical power relative to that of the other filament.

Advantageously, the device according to the invention optionally comprises a third reflective zone focused on the first light source. This third reflective zones is preferably at least partially annular in shape and/or is an extension of the second reflective surface. It therefore receives part of the light emitted by the first light source and is preferably allocated/dedicated to the DRL function like the first reflective zone (and unlike the second reflective zone): it is used in particular for increasing/adjusting the illuminating range of the DRL when necessary and preferably has no specific light source, apart from the first source. According to a preferred arrangement, part of the circumference of the third reflective zone is in contact or in the vicinity of the circumference of the first and/or second reflective zone: it therefore possibly forms the extension of one or other of these reflective zones, but without continuity of surface, and with a limited junction zone.

Advantageously, the first light source can be able to emit light in the direction of the part of the second reflective zone by a prior reflection of the light directly emitted on a fourth reflective zone of the flange type, in particular a flange associated with the first reflective zone. In other words, the light coming from the first source, which strikes a portion of the second reflective zone, can do this either directly or by having already been reflected once. "Flange" in the context of the invention means a portion of a zone with a reflective appearance which generally has a more aesthetic than optical role by offering continuity of appearance and surface in the zones separating two reflectors or separating the reflector from the walls of the housing or bezel for example. Here the flange is reflective, and can be made to fulfil this optical role.

Another object of the invention is a lighting device for an automobile, comprising a first light source focused on a first reflective zone and a second light source focused on a second reflective zone with the first light source able to emit light both in the direction of the first reflective zone and part of the second reflective zone. The light coming from the first light source and reflected by the two reflective zones corresponds to a light beam of given photometry, the first reflective zone is a reflector defining a first cavity in which the first light source is disposed and the second reflective zone is a reflector defining a second cavity in which the second light source is disposed. This light beam can be of the DRL or other type and thus be generated when the first source is switched on and the second is switched off. Conversely, it is also possible to provide for the second light source to be able to emit part of its light towards the first reflective surface so that when the first source is switched off and the second switched on, the light reflected by the two reflective surfaces makes it possible to obtain a beam with a photometry different from the previous one. There is thus a compact dual-function headlight, effectively adapted when one of the functions in particular is of the DRL type.

Advantageously, means are provided for preventing the second source being able to emit light in the direction of the first reflector in a significant fashion. It is thus possible to provide means comprising a wall (M) separating the two reflectors and/or a fresnelised zone in one of the reflectors, in particular the first reflector. This in particular proves useful when the second reflector associated with the second source are intended to emit a beam with cutoff.

Another object of the invention is the vehicle equipped with at least one of these devices.

It will be better understood by means of the non-limiting example embodiments described below with the help of the following figures.

All these figures are highly schematic, in order to be clear.

The same references correspond to the same type of component from one figure to another.

Figure 1:
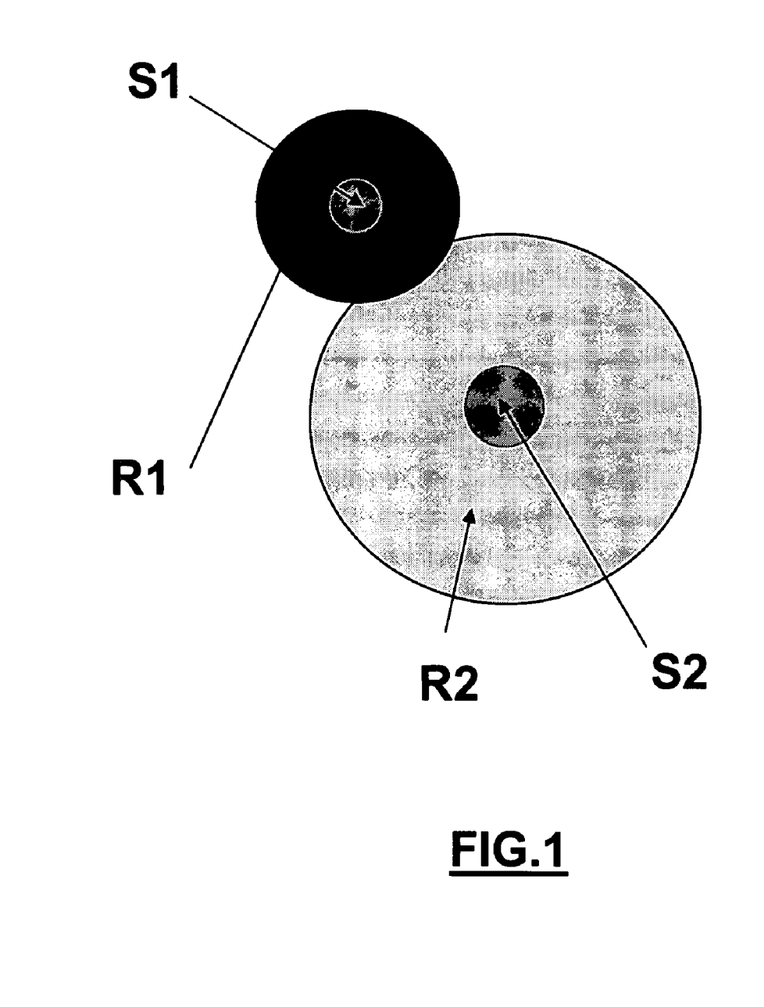
FIG. 1: a first variant of a headlight according to the invention with two cavities in front view.

FIG. 1 therefore depicts in front view a first dual-cavity variant: the first reflector R1 is depicted therein with its lamp S1 focused on R1 and generally disposed so as to be centred at the bottom of the reflector. The lamp is for example a halogen lamp of the H21 type and the reflector R1 has an outside diameter for example of approximately 40 mm.

The second reflector R2 is also depicted with its lamp S2 focused on R2 and also disposed at the bottom thereof. The lamp S2 is for example a halogen lamp of the H1 type and the diameter of the reflector R2 is for example approximately 90 mm.

The very simplified representation of R1 and R2 according to FIG. 1 shows that it is indeed a case of two distinct cavities, side by side, and for example moulded in the same piece. In this configuration, R1 is situated above R2, the two lamps being substantially aligned along an oblique axis with respect to the horizontal, once the headlight comprising them is mounted in the vehicle. However, it is clear that any other relative configuration also makes it possible to apply the invention, for example by reversing the positions of R1 and R2 or by disposing them in the same horizontal plane, one to the right of the other, or in any oblique plane with respect to the horizontal or along a vertical. This remark applies for all the other figures and examples of the present patent.

The DRL function is activated by switching on the lamp S1: it sends light to R2 but also to a part of R2, in particular, in the case depicted in FIG. 1, towards a lower portion of R2. It is the sum of the light from S1 reflected by R1 and reflected by the bottom portion of R2 which makes it possible to maintain the photometry and minimum illuminating surface required for a DRL, in particular by the aforementioned European regulation: the light from S1 reflected by R1 makes it possible to obtain the photometric grid of a DRL, and a light from S1 coming from R2 makes it possible to enlarge the illuminating surface required for the DRL.

When the DRL function is inactivated, the lamp S1 is switched off, and it is possible to activate the other function, dipped beam, main beam, etc, by switching on the lamp S2: the other function is, for the major part or essentially, obtained by the light emitted by S2 and reflected by R2. However, a certain quantity of light coming from S2 may also reach R1, in particular, in the configuration in FIG. 1, a top portion of R1. This does not interfere with a function without cutoff of the main beam type, and which may even be desirable and required: this is then a situation which recalls to a certain extent the situation concerning the DRL, where the function of the main beam type is provided overall by the light emitted by S2 and reflected by R2 but also possibly by R1, even if it is in much lesser proportions.

It will be noted that the bottom portion of R2 in fact participates both in the DRL and the second function of the main beam, dipped beam, etc type: it is therefore possible to ensure that this portion is optically defined so as to be a compromise between a definition where it would be entirely dedicated/adapted to the DRL and a definition where it would be entirely dedicated/adapted to the second function. It is alternatively possible also to choose to adjust it specifically for one or other function: it then participates in the other function but without being objectively defined for this. The optical definition of the reflective surface adapted to a main beam or dipped beam may for example be of the complex surface type, in a known fashion.

Figure 2:
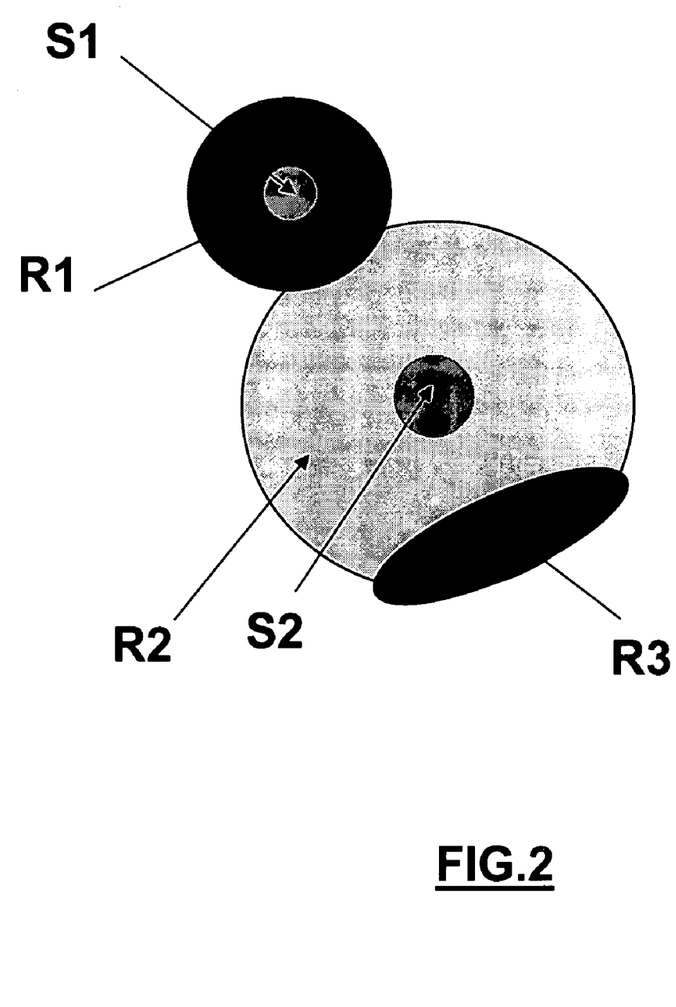
FIG. 2: a second variant of a headlight according to the invention with two cavities in front view.

FIG. 2 depicts a second "dual cavity" variant: the elements R1, R2, S1 and S2 as already defined from FIG. 1 are found again, but it also depicts a third reflective zone R1 with no specific lamp and lamp hole. This zone R1 has been adjusted in order also to reflect part of the light emitted by S1 and also to participate in the photometry of the DRL: S1 is therefore also focused on R3. This zone R3 may be an extension of R2 or not: even integrated in the cavity defined by R2 and extending, it generally has a discontinuity of surface with R2. The top part of R2 will be in the shadow of the bottom of the cavity R1 but S1 may all the same illuminate part of R2. R3 can receive light from S2, but in the case where R2 is designed for a beam with cutoff of the dipped or fog type it is preferable to provide for R3 to be convergent from the source S2 and for it therefore to reflect rays coming from S2 only under the cutoff. The advantage of this supplementary surface R3 is that it is possible to dedicate it/optically define it exclusively for the DRL function, or to define it as a compromise between the two functions.

Figure 3:
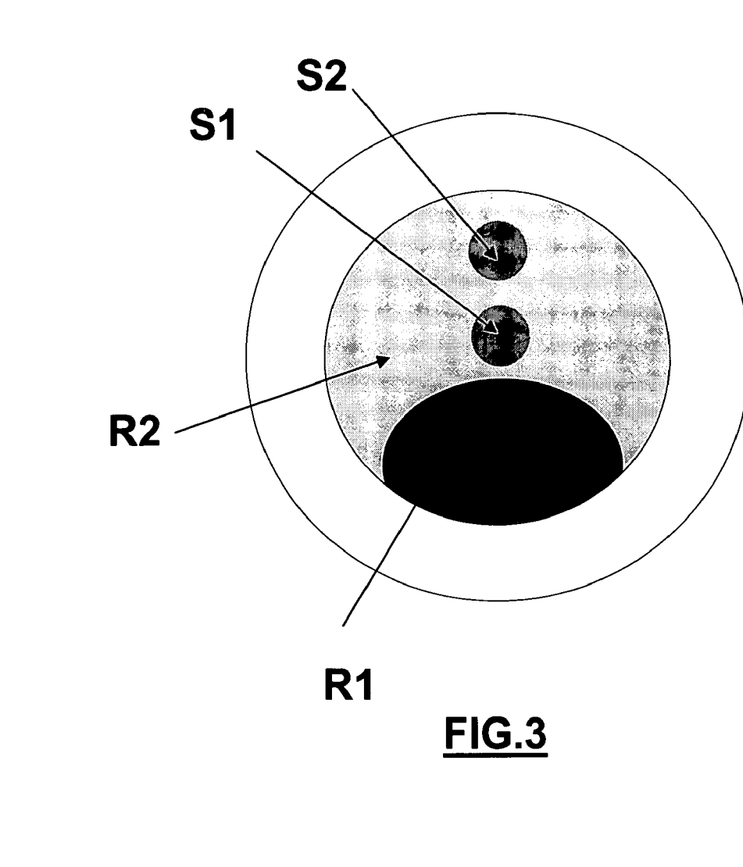
FIG. 3: a third variant of a headlight according to the invention with two cavities in front view.

FIG. 3 depicts a first "single cavity" variant: to fulfil the two functions, only one cavity is used associated with two lamps S1, S2 disposed in two offset lamp holes formed in the cavity. The cavity comprises a first reflective surface R1 on which S1 is focused. R1 is disposed at the bottom part of the cavity, on a surface whose circumferences partly follow the circumference of the cavity and partly a curved line. It also comprises a second reflective surface R2 on which S2 is focused, which geometrically completes the surface of R1 in order to define the cavity. As in the dual-cavity case in FIG. 1, the DRL function is therefore assured, for the major part, by the light emitted by S1 and reflected by R1, which is defined optically for a DRL. And part of the light emitted by S1 strikes a portion of R2, a portion which therefore also participates in the DRL, in particular in order to reach the required illuminating range surface.

Figure 4:
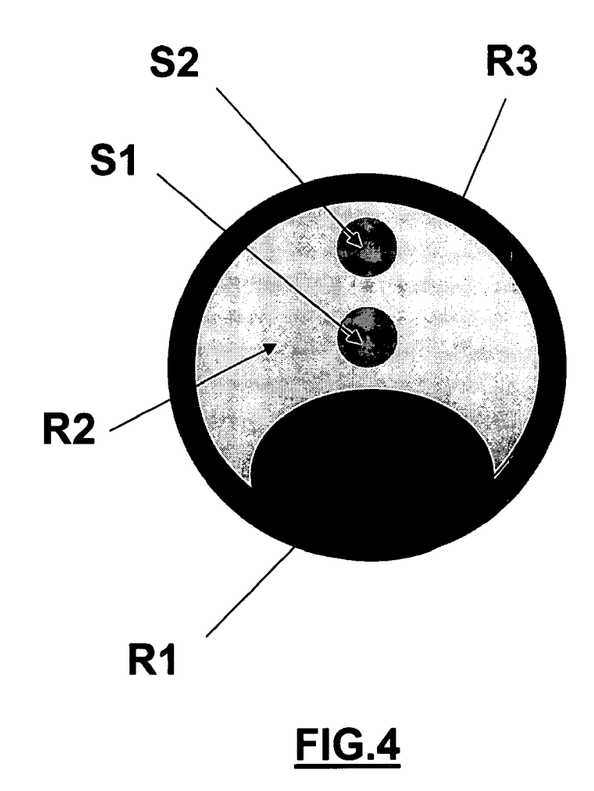
FIG. 4: a fourth variant of a headlight according to the invention with two cavities in front view.

FIG. 4 depicts a second "single-cavity variant": it comprises the elements already referenced in FIG. 3 but also comprises a third reflective zone R3, here in an approximately annular shape which, as in the case in FIG. 3, is defined to function with S1 (S1 also being focused on R3) in order to participate in the DRL. As the following figures will explain, this zone R3 of the annular type is not in junction over its entire circumference with R1 or R2 but only over a localised part of its circumference. It should be noted that, both for FIG. 3 and for FIG. 4, it is possible to define the surface R2 so that it is capable, associated with S2, of fulfilling all the photometry of the light beam of the second function of the dipped fog or main beam type: thus, even if, incidentally, part of the light from S2 strikes R1 when it is the second function that is activated, light reflected by R1 is superfluous for fulfilling this second function. It is also possible to make a different choice, and at least slightly to modify the optical definition of the portion of the reflector R1 receiving light emitted by S2, so that it intentionally participates in a controlled fashion also in the photometry of the second function.

Figure 5:
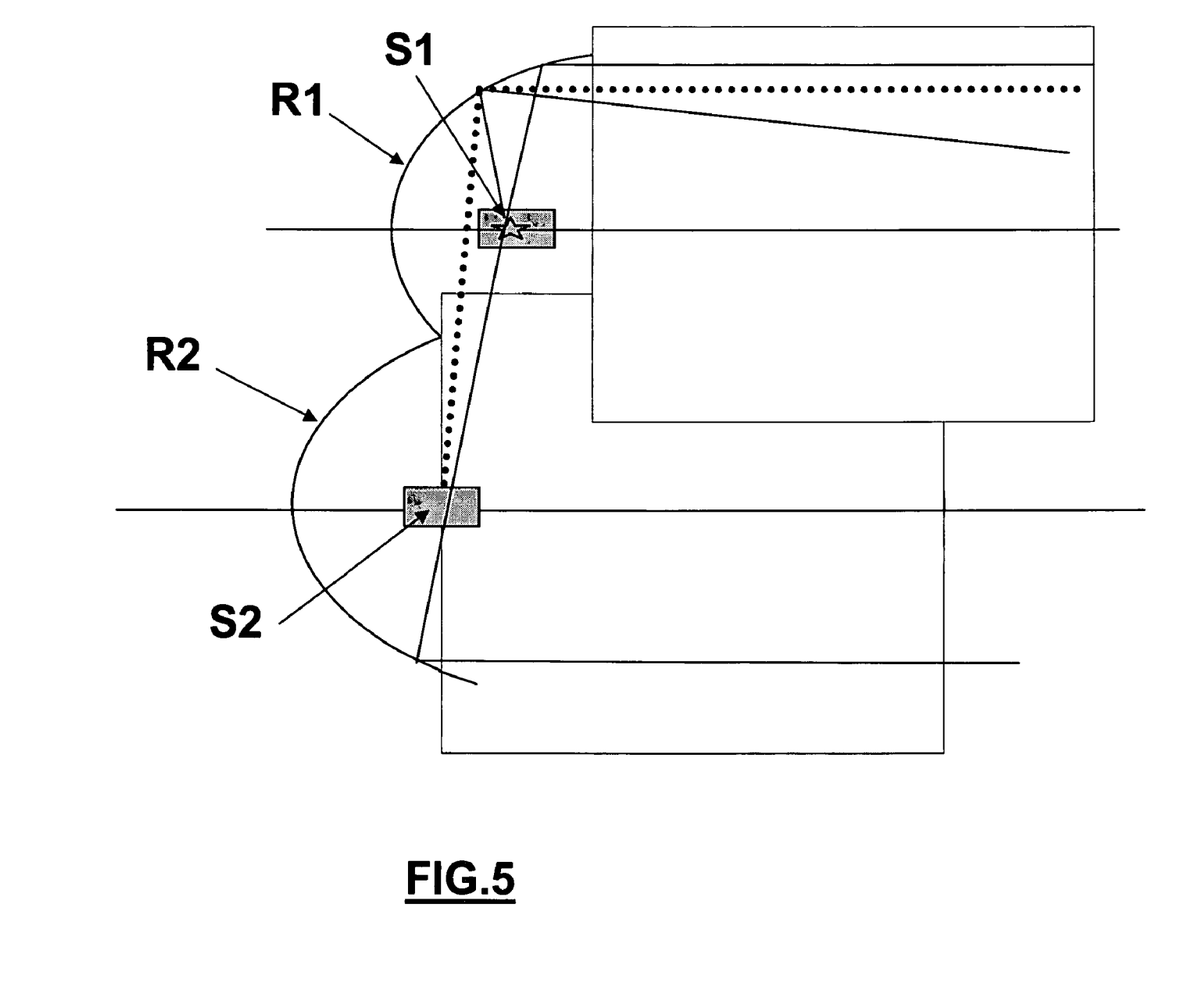
FIG. 5: a first example according to the first variant, in vertical section passing through the foci of the lamps.

FIG. 5 is a first example embodiment according to the "dual-cavity" variant depicted in FIG. 1 and described above. It is a case of a dual-function device of the main beam/DRL type, where the source is S1, S2 and the cavities R1, R2, in section along a vertical plane, are found again.

In order to fulfil the DRL function, S1 therefore sends a major part of its light onto R1, but also towards a bottom portion of R2: the path of a light ray emitted by S1 coming to strike R2 has been traced in solid lines. It will be understood that the quantity of light from S1 which will reach R2 and the delimitation of the zone of R2 which can be reached by the light emitted by S1 depend on many parameters, including the relative configuration of the two cavities, the position and power of the lamps, the position of the foci of the two cavities, and the way in which the two cavities are connected, in particular the position of the highest point of the "wall" M separating them with respect to the position of the lamps S1, S2 and/or foci of the two cavities R1, R2.

In order to fulfil the main beam function, S2 sends a major part of its light towards R2, which is defined so as to be able by itself to make the photometry of a main beam. However, in the example depicted, it can be seen that a (small) part of the light from S2 manages to strike a top portion of R1: a ray emitted by S2 and following this path has been shown in dotted lines. For a main beam, it is of no importance/effect for a leakage of light to be thus reflected by R1. As mentioned above, it can be chosen to adjust the top portion of R1 so that it works in an improved fashion both for a main beam and a DRL, and not only for the purpose of functioning for a DRL. Alternatively or cumulatively, it is also possible to choose to adjust the bottom portion of R2 so that it works in an improved fashion both for a DRL and main beam. FIG. 5 also shows in solid lines passing through the two lamps S1 and S2 the amplitude of the illuminating range of the DRL when the latter is activated: it can be seen that it is thus possible to have a much higher/larger illuminating range than if the DRL function were confined to the light reflected by the cavity R1.

Figure 6:
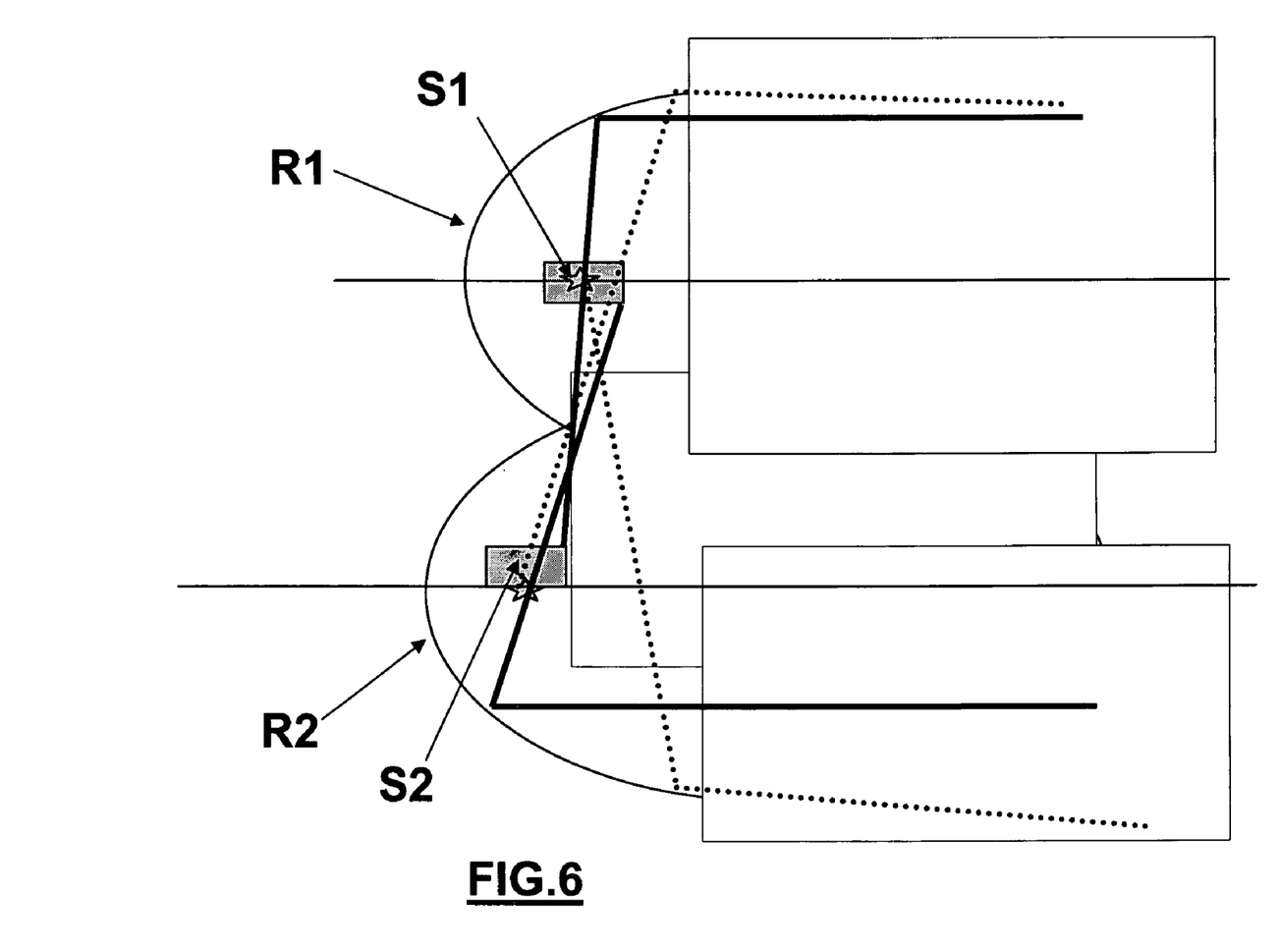
FIG. 6: a second example according to the first variant, in vertical section passing through the foci of the lamps.

FIG. 6 is a second example embodiment according to the "dual-cavity" variant depicted in FIG. 1 and described above. It is a case of a dual-function device of the dipped beam (or fog)/DRL type where the sources S1, S2 and the cavities R1, R2 are found again, in section along a vertical plane. This time, the second function is a function with cutoff (a situation similar to a fog/DRL dual function), which implies that it is useful to precisely control any "leakages" of light coming from S2 and reflected by R1 so as to ensure that no light is sent above the cutoff with an intensity such that the regulatory conditions of a dipped (or fog) beam would no longer be complied with. The shape of the cavities R1, R2 has therefore been modified, the lamps S1, S2 and the top point M of the "wall" separating the two cavities with respect to the example according to FIG. 5 have been moved, so that the filament of the lamp S2 is no longer "visible", or almost not, through the cavity R1. On the other hand, the lamp S1 remains capable of sending light at the bottom part of the cavity R2 so that it participates in the production of the illuminating range of the DRL. Two lines starting from S2 represent two parts of light rays emitted by S2 in the direction of R1 but which are convergent after reflection on R1: this is a first option, where the fact that rays emitted by S1 reach R2 is tolerated, but so that the rays reflected by R1 remain under the cutoff of the dipped or fog beam. Another option consists of preventing the rays emitted by S2 reaching R1: it is possible in particular to adjust the size/configuration of the wall M in order to block these rays. Two lines starting from S1 represent two paths of light rays emitted by S1 in the direction of R2: these two rays show the zone of R2 able to participate in the DRL function.

Figure 7A:
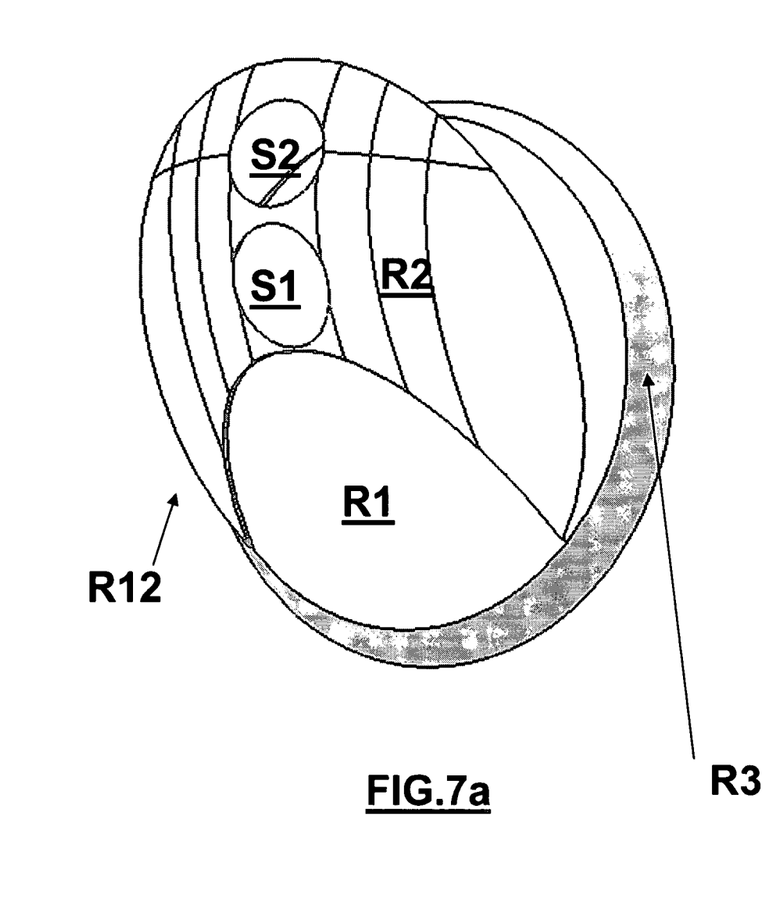
FIGS. 7a, 7b: a third example according to the fourth variant, in perspective view (7a) and in vertical section (7b) passing through the foci of the lamps.
Figure 7B:
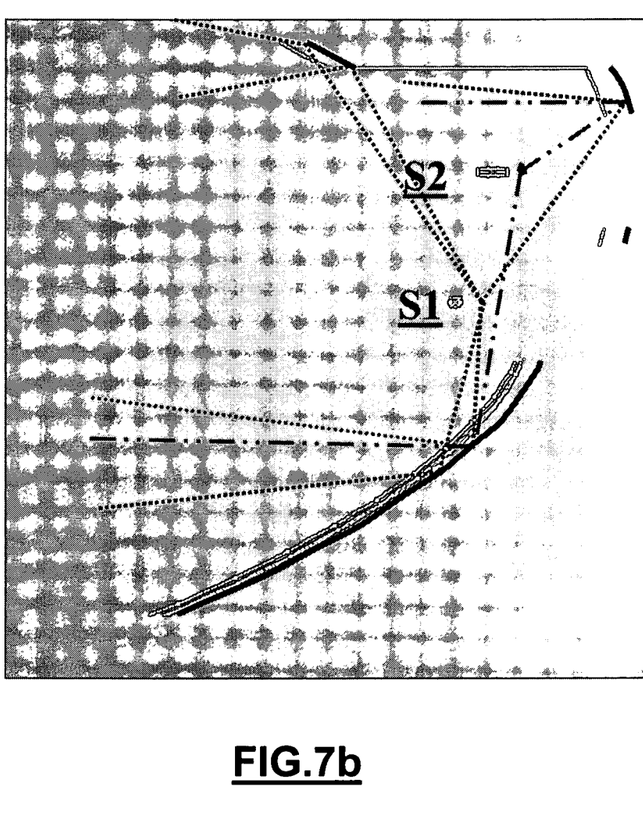

FIGS. 7a and 7b correspond to a third example embodiment of the invention according to the "single-cavity" variant already described with the help of FIG. 4. This example relates to a main beam/DRL dual function. The lamps S1, S2 can be seen in FIG. 7a symbolically represented: they are disposed one above the other, each having its associated reflective zone R1, R2, integrated in a single cavity R12. In this single-cavity configuration it will be noted that this one is not at the centre of or in the zone R1 but offset with respect to it. The reflective surface R3 can also be seen, focused on S1, and a part of the internal bottom circumference of which (the one whose diameter is the smallest) is adjacent to the bottom circumference I of R1 (which is also, in the portion of the cavity, a circumference of the cavity itself). The remainder of the internal circumference of the annular reflective zone of 3 is not in contact with the periphery of the reflective cavity R12. In order to ensure continuity of surface, it is possible to provide a surface filling in the space between the top part of the cavity 12 and the internal periphery of R3, for example in the form of a surface of the flange or bezel type, with a matt or reflective appearance but without, or almost without, any optical role other than aesthetic.

FIG. 7b shows in dotted lines the path of a light ray emitted by S1 and striking R3 in its top part so that it participates in the DRL function. Two rays emitted by S2 have also been shown by two discontinuous lines, one striking R2, that is to say the reflective zone defined in order to make a photometry of the main beam type, and another which manages to reach the reflective zone R1. The choice can therefore be of optically adjusting R1 solely with a view to participating in a DRL or choosing an optical definition which is a compromise between a participation in a DRL and a participation in a main beam.

One variant of this figure is its application to a dipped or fog/DRL dual function with, as in the case of the example according to FIG. 6 and for the same reasons, an illumination or greater control of the light emitted by S2 towards R1 or R3.

Figure 8A:
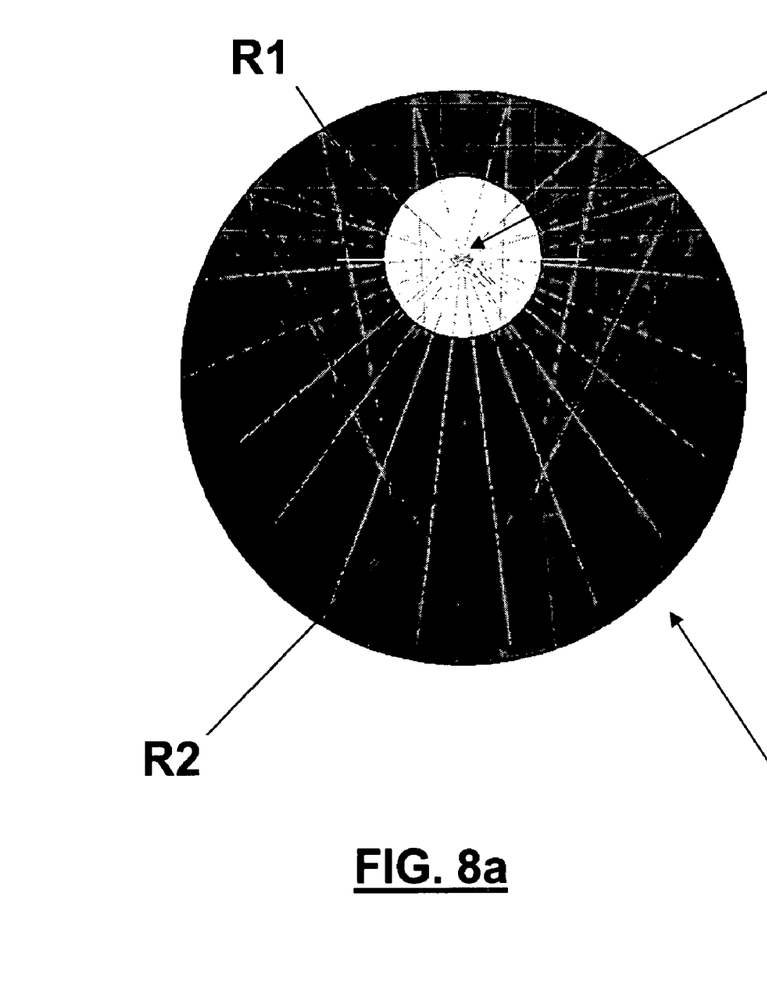
FIGS. 8a, and 8b: a fourth example according to a fifth variant, in front view (8a) and in perspective (8b).
Figure 8B:
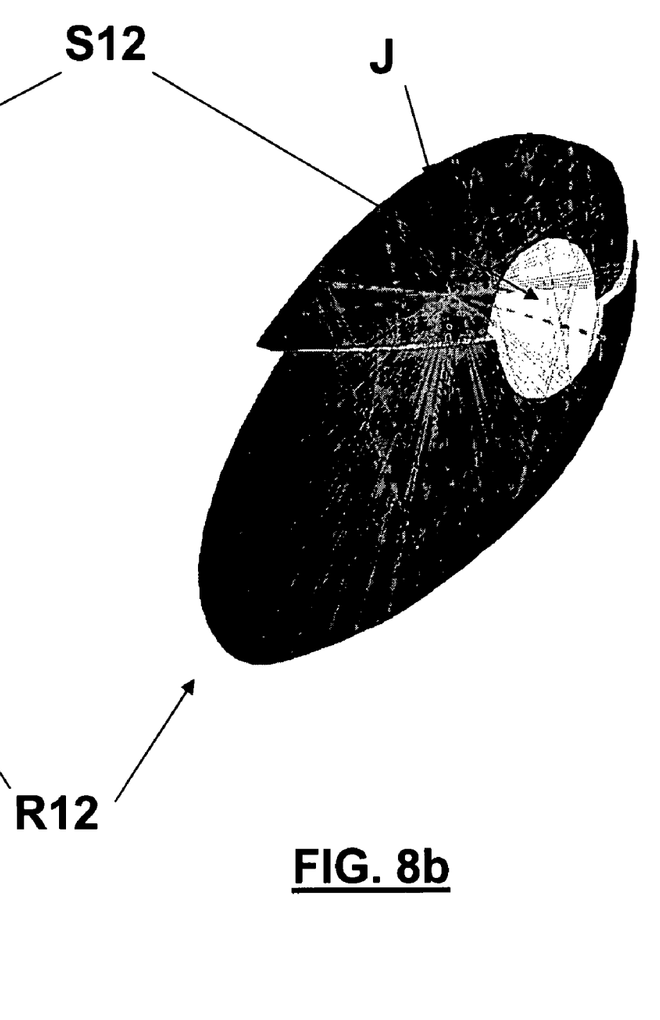

FIGS. 8a, 8b correspond to a fourth example, which repeats the single-cavity system of FIG. 3 but using not two distinct lamps S1, S2 but a single lamp S12 with two filaments, one for the DRL and the other for the main or dipped (or fog) beam. FIG. 8a is a front view where the zone R1 dedicated to the DRL is found, this time disposed at the top part of the cavity R12, and the zone R2 which supplements it in order to define the cavity. Rays in a star are shown, representing rays emitted by the main-beam filament and striking the zone R2 but also the zone R1. Concerning the rays emitted by the DRL filament, this example illustrates the case where rays will effectively strike part of the reflective zone R2 adapted to the second function of the dipped or main or fog beam type, but not by direct emission towards R2: here the rays coming from the DRL filament (that is to say the source S1 of the previous examples) will first of all be firstly reflected by a flange J depicted in FIG. 8b, which is in line with R1, in its top part. And the rays, once reflected on the flange J, are redirected by this towards R2, in order finally to be reflected by R2: these rays have therefore undergone a double reflection before emerging from the lighting device through its closure glass, unlike the rays striking R1 which for their part undergo only a simple reflection. This double-reflection path is represented by the rays shown by broken lines in FIGS. 8a and 8b.

Figures 9, 10A, 10B:
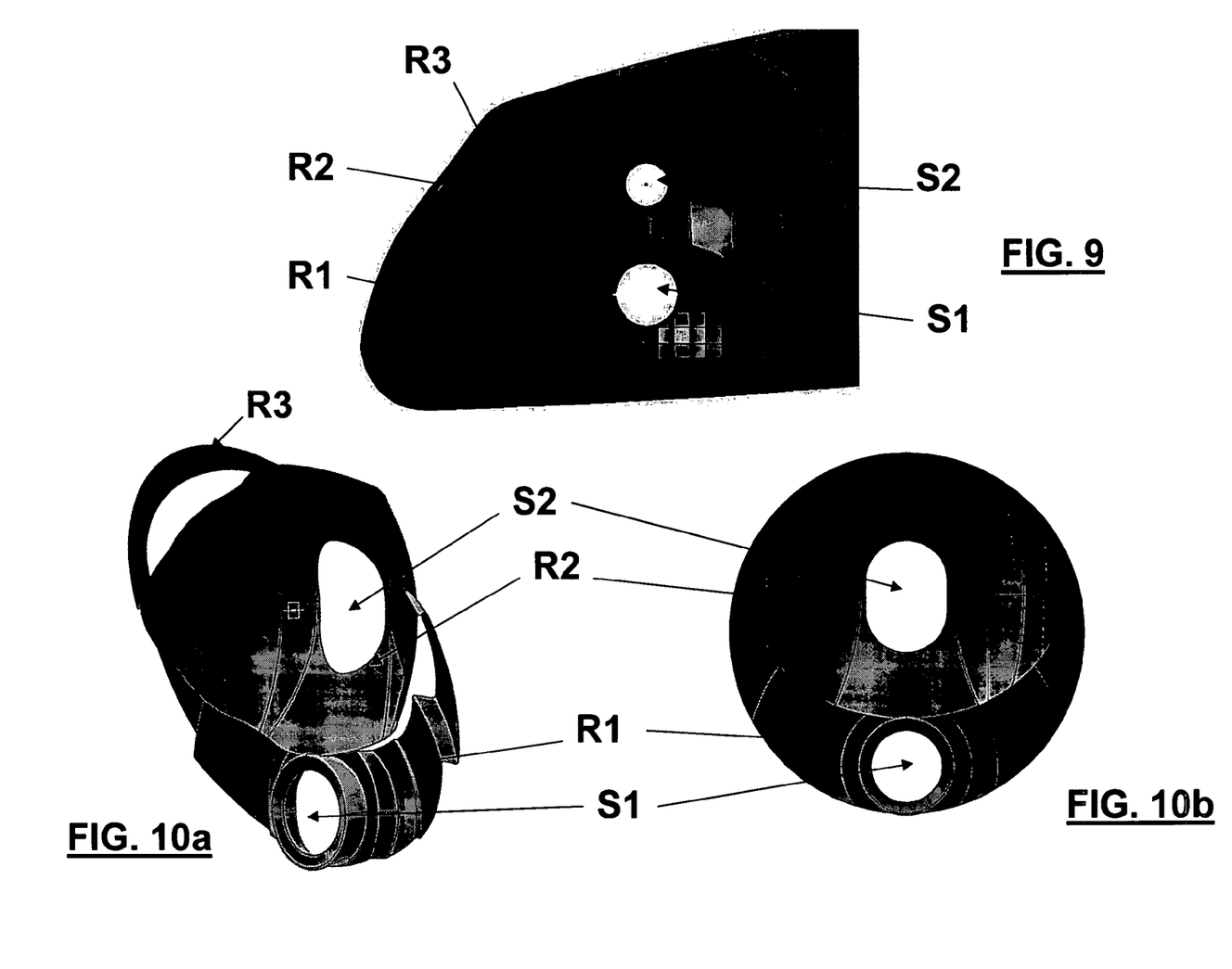
FIG. 9: a fifth example
FIGS. 10a, 10b: a sixth example.

FIG. 9 depicts another example according to a configuration approximating to the example in FIG. 4, but here the two sources S1 and S2 are distributed in two distinct reflectors: there is a reflector R1 in which a source S1 is disposed. This source is a dual-filament lamp having one filament dedicated to the DRL function and one filament dedicated to the town lamp. There is also a reflector R2 associated with a source S2 both adapted to emit a beam of the main beam type. There is also an additional reflective surface R3 of the skirt type: in DRL operating mode, the source S1 emits rays in the direction of the reflectors R1, R2 and R3 at the same time, in order to be able to create the required illuminating range of 40 $cm^2$. The skirt R3 is optional. This assembly therefore makes it possible to have three functions: main beam, DRL and town lamp, whilst being remarkably compact. It may be noted that in this embodiment, the reflectors R1 and R2 do not have a circular circumference: the invention applies to any shape of reflector.

FIGS. 10a, 10b depict another example, in three-quarter view (FIG. 10a) and in front view (FIG. 10b): it is a case here of a fog/DRL assembly composed of the reflector R1 in which the source S1 is disposed for the DRL function and a reflector R2 associated with a lamp S2 above adapted to emit a beam of the fog type. There is also a skirt R3 which has the same function as in the previous examples. This skirt R3 may be distinct from the reflector R2 or form an integral part thereof. A particular shape will also be noted of the part of the reflector R1 where the lamp S1 is situated, which has a fresnelised zone: "steps" ME are created in the mirror. These steps ME make it possible in particular for the fog beam emitted by S2 with R2 not to be disturbed by stray rays coming from the source S2 and which would be liable, without these steps, to strike the DRL-dedicated reflector R1.

In conclusion, the invention offers many possibilities of application for dual-function headlights and is particularly advantageous for those involving a DRL function, using reflectors or portions of reflectors in two different ways, so that they participate in alternation in one or other function. The gain in terms of compactness is significant, the invention thus offering a flexible and effective response to the requirement for an illuminating range with a large surface area required in particular by the DRL function.

What is claimed is:

1. Lighting device for an automobile, comprising:
a first light source focused on a first reflective zone and a second light source focused on a second reflective zone;
wherein the first light source is configured to emit light in the direction of both the first reflective zone and part of the second reflective zone, the light coming from the first light source and reflected by the two reflective zones corresponding to a daylight running lamp light beam.

2. Device according to claim 1, wherein the reflection by the second reflective zone of the light reflected by the first light source is direct or is preceded by at least one prior reflection on a reflective surface.

3. Device according to claim 1, wherein the second light source is configured to emit light in the direction of the second reflective zone and also in the direction of part of the first reflective zone, the light coming from the second light source and reflected by the reflective zone or zones corresponding to a beam with cutoff of the fog, dipped beam, town beam, motorway beam or overhead light beam type, or to a beam without cutoff, of the high beam type.

4. Device according to claim 1, wherein the first reflective zone is a reflector defining a first cavity in which the first light source is disposed.

5. Device according to claim 1, wherein the reflective zones form part of one and the same reflector, defining a single cavity in which the two light sources are disposed.

6. Device according to claim 5, wherein the two light sources form part of one of the same multi-filament lamp.

7. Motor vehicle, wherein it is equipped with at least one device according to claim 1.

8. Lighting device for an automobile, comprising:
a first light source focused on a first reflective zone and a second light source focused on a second reflective zone;
wherein the first light source is configured to emit light in the direction of both the first reflective zone and part of the second reflective zone; and
further wherein the first reflective zone is a reflector defining a first cavity in which the first light source is disposed and the second reflective zone is a reflector defining a second cavity in which the second light source is disposed.

9. Lighting device for an automobile, comprising:
a first light source focused on a first reflective zone and a second light source focused on a second reflective zone;
wherein the first light source is configured to emit light in the direction of both the first reflective zone and part of the second reflective zone; and
further including a third reflective zone focused on the first light source.

10. Device according to claim 9, wherein the third reflective zone is at least partially annular in shape and/or is an extension of the first or second reflective surface.

11. Device according to claim 9, wherein part of the circumference of the third reflective zone is in contact with or close to the circumference of the first and/or second reflective zone.

12. Lighting device for an automobile, comprising:
a first light source focused on a first reflective zone and a second light source focused on a second reflective zone;
wherein the first light source is configured to emit light in the direction of both the first reflective zone and part of the second reflective zone; and
further wherein the first light source is configured to emit light in the direction of part of the second reflective zone by a reflection prior to the light directly emitted on a fourth reflective zone of the flange type, in particular a flange associated with the first reflective zone.

13. Lighting device for a motor vehicle, comprising:
a first light source focused on a first reflective zone and a second light source focused on a second reflective zone;
wherein the first reflective zone is a reflector defining a first cavity in which the first light source is disposed, in that the second reflective zone is a reflector defining a second cavity in which the second light source is disposed, and in that the first light source is configured to emit light both in the direction of the first reflective zone and part of the second reflective zone, the light coming from the first light source and reflected by the two reflective zones corresponding to a light beam of given photometry.

14. Lighting device for a motor vehicle according to claim 13, wherein means are provided for preventing the second source being able to significantly emit light in the direction of the first reflector.

15. Automobile lighting device according to claim 14, wherein the means comprise a wall separating the two reflectors and/or a fresnelised zone in one of the reflectors, in particular the first reflector.

16. Lighting device for an automobile, comprising a first light source focused on a first reflective zone and a second light source focused on a second reflective zone;
wherein the first light source is configured to emit light in the direction of both the first reflective zone and part of the second reflective zone; and
further wherein means are provided for preventing the second source being able to significantly emit light in the direction of the first reflective zone, the means including a wall separating the two reflectors and/or a fresnelised zone in one of the reflectors, in particular the first reflector.

* * * * *